May 2, 1933.   E. HEDIGER   1,906,853

SILICON CARBIDE RESISTOR AND MANUFACTURE THEREOF

Original Filed Aug. 17, 1929   2 Sheets-Sheet 1

INVENTOR
Ernst Hediger
by his attorneys

May 2, 1933. E. HEDIGER 1,906,853
SILICON CARBIDE RESISTOR AND MANUFACTURE THEREOF
Original Filed Aug. 17, 1929   2 Sheets-Sheet 2
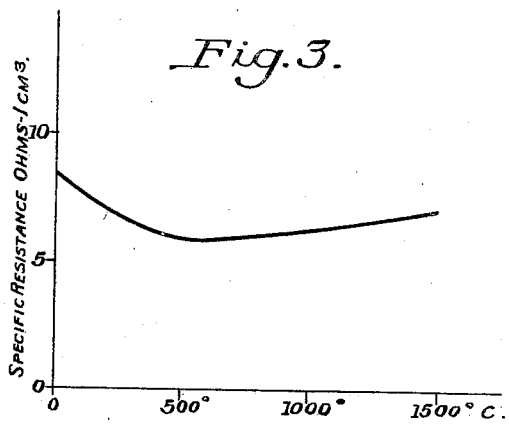
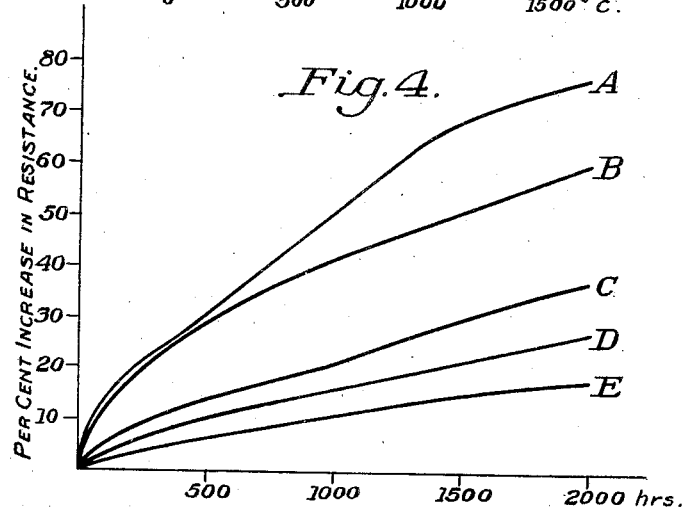
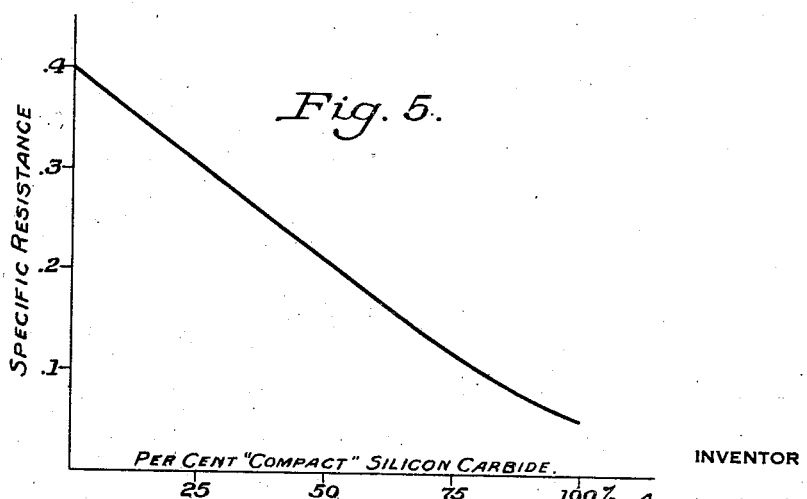

Patented May 2, 1933

1,906,853

UNITED STATES PATENT OFFICE

ERNST HEDIGER, OF NIAGARA FALLS, NEW YORK, ASSIGNOR TO GLOBAR CORPORATION, OF NIAGARA FALLS, NEW YORK, A CORPORATION OF NEW YORK

SILICON CARBIDE RESISTOR AND MANUFACTURE THEREOF

Continuation of application Serial No. 386,518, filed August 17, 1929. This application filed November 17, 1931, Serial No. 575,665, and in Canada July 19, 1930.

This invention relates to silicon carbide resistors and their manufacture, and particularly to a self-bonded resistor having commercially desirable electrical properties. The present application is a continuation of my copending application, Serial No. 386,518, filed August 17, 1929.

Silicon carbide in the various forms in which it is commonly known does not possess electrical characteristics which make it adaptable for use as an electric heating element. The crushed grain possesses a very high electrical resistance in comparison with other conducting materials, and usually has a specific resistance of the order of magnitude of several million ohms per centimeter cube. The usual bonded refractories composed of silicon carbide also have a very high specific resistance, especially when cold, and are characterized by a temperature coefficient of resistance so extremely negative that their use for electrical heating purposes is entirely impractical.

In order to secure the properties necessary when the material is to be used as a heating element, it has heretofore been considered essential to bond the grains with a fusible conducting material such as silicon. Even this procedure has not proven entirely satisfactory, and various efforts have been made to subsequently convert the silicon used as a bond to silicon carbide. The heating elements made by the silicon bonding process possess a negative temperature coefficient of resistance throughout the range of temperatures in which they are operated, and they increase in resistance comparatively rapidly owing to the oxidation of the bonding material at high temperatures.

In making my resistors, I employ a process wherein the crystals are self-bonded and in which, with the exception of a temporary agglutinant, no fusible bonding material is used. It has been known for some time that when molded shapes of silicon carbide are heated to a sufficiently high temperature the crystals grow together, apparently by evaporation and redeposition, to form a coherent mass which retains its strength even at very high temperatures. This process is known as "recrystallization", and has been resorted to in the production of refractories.

Recrystallized silicon carbide as produced in the refractory art is not suitable for an electrical heating element, and a recrystallized heating element is made practicable by certain modifications in the process, which I will hereinafter describe. The usual recrystallized material such as produced for a refractory purpose is, when cold, almost an insulator, but with rising temperature the resistance decreases enormously, so that if a heating current is to be maintained, the voltage must be continually regulated to prevent the destruction of the element. The cold resistance may be from 10 to 100 times that of the material when it becomes heated.

In the usual method of recrystallization an electric furnace is used for heating the molded articles to the recrystallizing stage, but the heating current is not passed directly through the material itself, and such a procedure has been considered impractical because of the extremely high resistance of the uncured mix. I have found that by forcing an appreciable current directly through the resistors during the curing process, the electrical properties of the product are entirely altered. The passage of an electric current through the element during curing greatly decreases the electrical resistance, the change in conductivity in many cases being of the order of magnitude of several hundred times. For example, a rod ½ inch in diameter and 6 inches long recrystallized by the usual process used for the manufacture of refractories has a cold resistance which is usually from several hundred to more than ten thousand ohms, whereas a rod of these dimensions through which the current is passed during the curing process will, if made in accordance with my process, have a cold resistance of less than ten ohms. This great decrease in resistance, when the rod is cold, makes possible the manufacture of recrystallized elements of reasonably small diameter which will become self-heated to high temperatures with the usual line voltages and without regulation.

The effect on the temperature coefficient of resistance of passing the electrical current through the element during curing is even more unusual than the decreasing of its cold resistance, for it is possible by this method to produce an element having a positive temperature coefficient of resistance at the usual operating temperatures, whereas the resistance temperature coefficient of silicon carbide in any of its usual forms is negative at all temperatures. Although elements made by the practice of my invention have a negative temperature coefficient in the temperature range below that at which they are usually operated (as for example, up to a dull red heat), the cold resistance is only from about 1½ to 3 times that of the element when heated, instead of from ten to one hundred times as is the case with the usual re-crystallized material.

I do not know the exact reason for the effect produced by passing the current through the element during curing, but believe that either the high starting voltage or the passage of a substantial current through the material during recrystallization breaks down the high inter-crystalline contact resistance between the individual grains, which otherwise causes a high electrical resistance and an extremely negative temperature coefficient of resistance.

The method of producing my resistors and the properties of the resistors obtained are illustrated in the accompanying drawings, in which Figure 1 shows a burning bed or furnace suitable for recrystallizing my resistors;

Figure 3 is a curve similarly showing the variation in resistance with temperature increase of a typical element made by my process;

Figure 1:
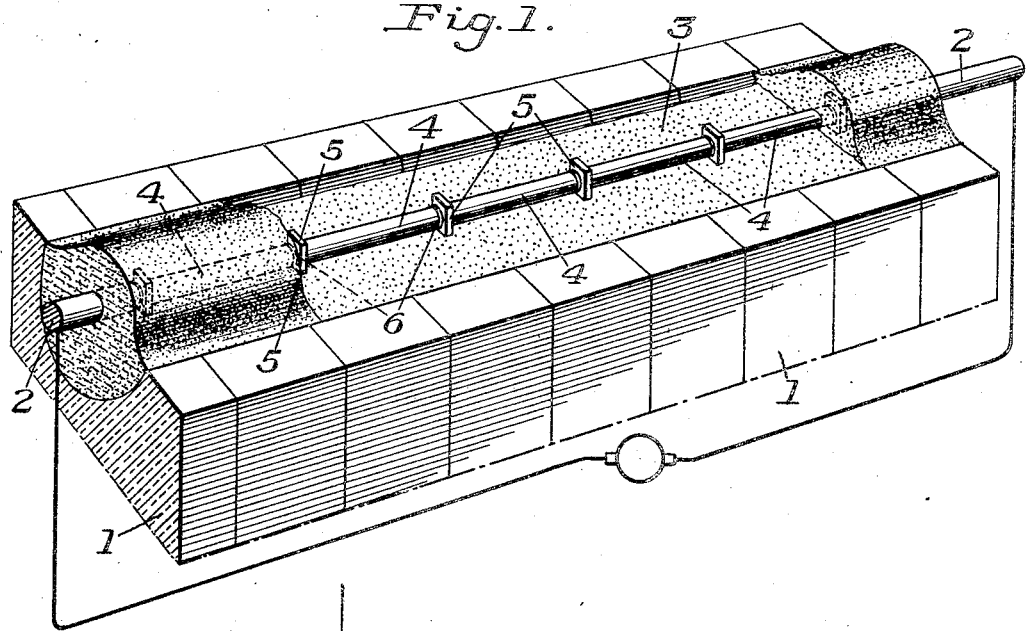
Figure 2:
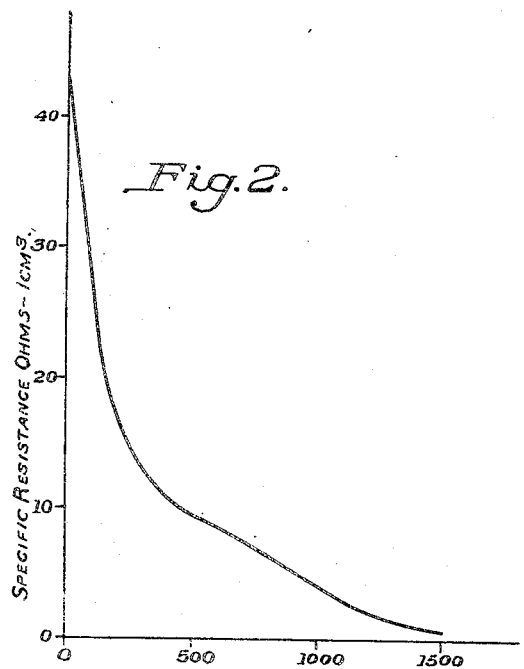
Figure 2 is a curve showing the variation in resistance with temperature variation of a typical recrystallized element through which no current was passed during the curing process and burned in the manner that recrystallized refractories are generally burned.

Figure 4 shows a series of curves representing the variation in resistance with time of operation of elements produced by varying the proportion of what I term "dense" or "compact" silicon carbide and ordinary silicon carbide, the curves representing a range from 0 to 100% of the compact variety; and Figure 5 is a curve showing the change in electrical resistance produced in the finished element by mixing the compact and ordinary varieties of silicon carbide in varying proportions.

In making my resistors I have discovered that the nature of the raw material from the standpoint of its crystalline structure is of great importance in determining the properties of the element. While it is possible by my process to make a highly conducting resistor from any type of silicon carbide which would be satisfactory for refractory or abrasive purposes, I have found that certain advantages are to be gained from grain which is specially selected, and particularly from a grain made by crushing a variety of silicon carbide which is much more dense or compact than the usual crystalline variety, and which I shall further describe.

Silicon carbide as it is usually produced for abrasive and refractory purposes consists of a porous aggregate of crystals which are more or less perfectly developed in regard to external form, and in the usual silcon carbide furnace every effort is made to produce a material having this open crystalline character. Under certain conditions of furnace operation it is also possible to produce silicon carbide in densely compacted masses practically devoid of external crystalline form. Silicon carbide of this variety is characterized by a high apparent density in lump form. I have found that this compact variety of solicon carbide, when crushed into grain and formed into a resistor in accordance with my invention, imparts certain electrical characteristics which cannot be duplicated with the usual highly crystalline variety of silicon carbide treated under identical conditions. These properties may be summarized as follows:

1. A very low specific resistance.
2. A cold resistance which is practically the same as that of the element when heated to its operating temperature.
3. A more positive temperature coefficient of resistance in the higher temperature ranges; i. e., above a dull red, than when the usual variety of silicon carbide characterized by external crystal form is treated under identical conditions.
4. A less rapid increase in resistance during use, and consequently a longer life.

The compact variety of silicon carbide is not in itself a highly conducting material, and in granular form of, for example 60 mesh, it may have a specific resistance of more than one million ohms per centimeter cube. By self-bonding this material by the passage of an electric current through it, I am able to reduce this resistance to less than .10 ohm per centimeter cube when measured at room temperature. The specific resistance of the element when heated is only one half to one fifth that obtained with the ordinary variety of silicon carbide crushed and treated in an identical manner. This very low specific resistance makes possible the manufacture of recrystallized heating elements specially applicable for furnaces, which elements are of considerable length and which will carry very heavy currents.

The low cold resistance imparted to the resistor by the compact silicon carbide is shown in Figure 3. With ordinary grain made by crushing the highly crystalline variety of silicon carbide the cold resistance is usually about three times that of the element when heated, and may be even greater with certain types of grain. With the compact variety of silicon carbide, the cold resistance of the element is seldom more than one and a half times that of the element when heated, and with proper control of the curing process the two resistances, i. e., hot and cold, can be made practically identical.

The increased life imparted by the compact silicon carbide is shown in Figure 4, in which the curves represent the increase in resistance with time of operation. Curve A shows the average life of several resistors made from the ordinary variety of silicon carbide, while curves B, C, D and E show the life of elements containing 25, 50, 75 and 100 percent, respectively, of the compact variety of silicon carbide. The much longer life of elements containing larger amounts of the compact variety of silicon carbide is apparent from an inspection of these curves.

A method of making compact masses of silicon carbide suitable for making resistors of the type described is disclosed in a copending application of Otis Hutchins, Serial No. 575,631, filed of even date herewith. In this process the usual type of silicon carbide furnace is operated so that the conducting core used for heating the sand carbon mix dissipates approximately 30 percent more heat per unit area than in the manufacture of the usual abrasive grain. As an example, the energy dissipated by the core in the manufacture of the usual highly crystalline grain is approximately 4.4 kilowatts per square foot of core area, whereas in the manufacture of the compact variety of silicon carbide this energy dissipation can be increased to about 5.7 kilowatts per square foot of core area. The carbon content of the mix is also increased slightly, as for example, from about 40 per cent in the usual mix to about 43 per cent in the mix used for the compact silicon carbide.

The dense silicon carbide made by this process can be separated from the furnace in massive chunks which are usually dark green in color and have a glassy fracture which appears almost metallic by reflected light. Microscopic examination shows that a considerable portion of the material is transparent or translucent in sections of $\frac{1}{16}$ to $\frac{1}{8}$ inch in thickness. Polished sections are often sufficiently transparent so that they can be examined for a slight depth below the surface, and show a ground mass of glassy appearance in which are embedded a considerable number of perfectly formed crystals of silicon carbide, usually hexagonal plates, which may be almost microscopic in size. The ground mass is apparently continuous except that it is bounded into irregular shaped areas similar to the grains in a cast metal. The structure resembles that obtained from the solidification of a fused mass.

Chemical analysis of the compact material shows that the total silicon content is practically identical with that of the compound SiC. The specific gravity is approximately 3.25, which is very close to that of the ordinary variety of silicon carbide. The material is characterized by an irregular fracture which does not coincide with the original crystal surfaces produced in the formation of the material, and the unusual electrical properties imparted to the resistor may be partly due to this fact, since the electrical properties of the perfectly formed crystal faces are known to be very erratic. The material differs further from the usual silicon carbide crystals in that it does not possess a laminated structure. Perfectly formed silicon carbide crystals consist of almost innumerable laminations, and the electrical properties are highly directional.

In the crushed grain it is often possible to find individual particles which are composed of parts of two separate crystal units, the boundary between these units being buried within the particle itself. In the larger particles, the separately crystallized silicon carbide within a matrix of silicon carbide can often be observed even in thin sections of the finished resistor.

Although the compact variety of silicon carbide can be readily distinguished by its appearance, a further distinction can be based on apparent density. The apparent density of a body can be defined as the weight in grams of one cubic centimeter of the material when the volume includes both the solid matter and the pore space. In measuring the apparent density of lump silicon carbide, a lump having a minimum dimension of about two inches should be weighed in air, and the pores then impregnated with paraffin by boiling in the latter and allowing the paraffin to solidify without removing the piece. The original shape of the piece is then restored as nearly as possible by cutting or scraping off most of the excess paraffin and then gently applying a Bunsen burner to the outer portions of the piece until the original shape is restored. The impregnated lump is then weighed in air and reweighed in water, the volume being determined by the loss in weight and the apparent density is then calculated in the usual manner. The compact variety of silicon carbide will have an apparent density of from approximately 2.5 to 2.7, and occasionally as high as 2.9 when measured as described. The apparent density of the ordinary variety characterized by external crystal form is usually less than 1.8, and may be as low as .6.

The specific resistance of the compact silicon carbide crushed to 60 grit is of the order of magnitude of from one to ten million ohms per centimeter cube, although wide variations from this value will still produce a satisfactory resistor. Electrical resistance measurements on crushed grain cannot be duplicated unless a definite set of conditions obtains with each measurement, so that I have standardized on a value measured in a "Pyrex" glass tube 2.5 cm. in diameter and 3.5 cm. long, with an applied voltage of 14 volts per centimeter and under a pressure of 15 kg/cm$^2$. The degree of packing makes considerable difference in the result, and in my measurements the tube used as a container is filled without shaking or jolting and the pressure applied by a plunger attached to a lever arm weighted 24 inches from the plunger. The lever is on a rack and pinion at its weighted end, so that it can be lowered gradually until the pressure is applied to the grain. Chromium plated plungers are used for electrical contact. I will designate the specific electrical resistance of the grain when crushed to 60 grit and measured under the above conditions as the "resistance value" of the material. By "60 grit" I refer to the particle sizes as specified by the Technical Committee of the Producers of Electric Furnace Abrasives, prepared in collaboration with the Bureau of Standards.

In making my resistors any proportion of grit sizes which will produce a satisfactory refractory can be used. Owing to the insulating character of the unburned mix, it is desirable to add a small amount of a conducting material, such as carbon, to the mix so as to facilitate the passage of the current through it during the early stages of burning. The following is an example of a mix which can be used:

| | Per cent |
|---|---|
| 14–36 mesh silicon carbide | 20 |
| 40–70 mesh silicon carbide | 20 |
| 80 and finer silicon carbide | 58 |
| Carbon (lamp black or powdered graphite) | 2 |

The mix is moistened with sodium silicate solution as a temporary agglutinant in order to give the mix the proper consistency for molding the shape. The binding agent is only temporary and is decomposed at the high temperatures used in curing. Other temporary binders such as lignone can be used, but sodium silicate is preferred.

Any method of molding can be used which will give a high degree of uniformity. I have found that tamping with a sharp pointed instrument, especially if the mix is added slowly and continuously during tamping or in very small additions, gives very satisfactory results. This method of consolidation is described and claimed in an application of Almer J. Thompson, Serial No. 515,603, filed February 13, 1931. The mold may be tubular and is preferably lined with paper, as described in U. S. Patent No. 1,765,572. The element is dried and given a preliminary baking at about 600° C. in order to give it additional mechanical strength and to permit its removal from the mold without breakage.

In making elements of large diameter, it is often desirable to provide a large radiating surface in comparison with the cross-section of the element. This may be accomplished by forming the resistor around a material which will carbonize or disintegrate during the curing process. A cotton rope such as is used for sash cord can be used for this purpose. When the element is subjected to the preliminary baking treatment the rope carbonizes and the residue can be readily removed.

Before curing the resistors they should be coated with a composition which will protect them during the curing process, and preferably one containing a conducting ingredient so as to further facilitate the passage of current in the immediate vicinity of the rod during the early stages of burning. I have found that a coating produced by dipping the elements in a slip or slurry composed of finely divided sand and carbon suspended in water gives very desirable results. The slurry is made so as to have a consistency of a thin paste, in order that a coating of appreciable thickness will adhere to the rod. The coating may also be applied by painting or spraying if desired. During the burning process the coating forms a shell or "cocoon" which can be readily brushed off, leaving the surface of the rod in its original condition. If the rod is merely buried in the loose sand carbon mix of the furnace bed without applying the slurry, the surface becomes pitted and the silicon carbide formed in the mix of the furnace bed adheres to the rod. A higher starting voltage for curing or firing the resistors is also necessary when no slurry is used, because of the conducting property of this coating, as above noted.

After the resistors are coated with the slurry they are placed end-to-end in a burning bed of the type shown in Figure 1, which is composed of a refractory bottom or trough 1, with electrodes 2 at either end. The trough is covered to a depth of about 2 inches with a mixture 3 of finely divided silica and carbon in approximately the proportion of three parts of silica to one part of carbon. The coated rods are placed on this embedding mixture and joined to each other and to the electrodes by means of graphite blocks 5 and a conducting paste 6 of graphite, silicon and water. The rods are then uniformly covered with a small amount of sand carbon mixture. The curing operation is then effected by applying a voltage to the terminals 2.

It will be observed that the resistors are positioned so that the current passes longitudinally through the rod, even at the very beginning of the operation, so that current is flowing through the rod at the time recrystallization first begins or the rod first begins to heat up. This method of recrystallization produces a radial structure or "orientation" of the crystalline particles, which is characteristic of an element cured by this method.

During the early portions of burning the electrical resistance of the elements is very high, and an initial voltage of 500 volts per linear foot is often necessary to start the heating process. During curing, the resistance decreases enormously, so that it is necessary to continually regulate the applied voltage. The temperature is not measured directly, but the burning schedule determined by trial. It is not deemed necessary to give a burning schedule which will be applicable to all types and sizes of rod, but obviously resistors of large cross-sectional area will require a higher power input than the smaller elements. By way of example, a satisfactory element one-half inch in diameter can be cured by gradually increasing the power from zero to 3.6 kilowatts per linear foot of resistor through a period of seven minutes, and holding the power at this value for eight minutes. The current in amperes necessary to effect recrystallization will vary with the type of grain used, but will usually be about 35 amperes for a half inch diameter element. With practically any resistor the current will exceed 75 amperes per square inch of cross-section.

During the curing of the resistor, the heating of the sand carbon mix will generate an atmosphere of carbon monoxide, and silicon vapor and silicon carbide vapor are also believed to be present. Such an atmosphere is very conductive to recrystallization. Silicon carbide can also be introduced into the surrounding mixture, and I have found that an embedding mix containing silicon carbide functions more efficiently to produce recrystallization than a mix which is initially devoid of this constituent.

A great advantage of my process is the control of the resistance afforded in the finished element. If the grain making up the resistor is of uniform character with respect to kind and grit size, and if the same burning schedule is used with each set of elements, the resistance can be accurately duplicated. I am also able to obtain a wide variation in specific resistance by varying the proportions of the compact and ordinary varieties of silicon carbide used. A typical chart for the variation of specific resistance by this method is shown in Figure 5. The specific resistance can be varied over a range of from about .06 ohm per centimeter cube to about .4 ohm per centimeter cube by increasing the proportion of the ordinary variety of silicon carbide.

From the foregoing it may be seen that my invention provides an improved silicon carbide resistor having commercially desirable properties not heretofore obtainable and the process enables the resistors to be made in quantity at a reasonable cost and with a predictable uniformity of electrical and physical characteristics. Owing to the wide variation in specific resistance made possible by the mixing of the two varieties of silicon carbide in varying proportions, elements can be made in convenient sizes which will operate at temperatures of from 750° to 1500° C. at the usual line voltages. Various detailed steps of procedure as herein described are to be considered illustrative of a present preferred practice and various modifications therefrom are obviously within the contemplation of the invention.

I claim:

1. The method of making a silicon carbide resistor which comprises forming the resistor from a mix consisting principally of silicon carbide grains, and self-bonding the formed mass by the passage of an electric current through the resistor.

2. The method of making a silicon carbide resistor which comprises forming the resistor from a mix consisting principally of silicon carbide grains, and heating the resistor to a temperature sufficient to effect recrystallization by the passage of an electric current longitudinally through the resistor.

3. The steps in the process of making silicon carbide resistors which comprise adding a small quantity of a material more conducting than granular silicon carbide to a mix of silicon carbide grains, forming the resistor, and heating the resistor to a temperature sufficient to effect recrystallization by passing an electric current through the resistor.

4. The steps in the process of making a silicon carbide resistor which comprise adding a small quantity of carbon to a mix of silicon carbide grains, and self-bonding the resistor by applying an electric current to opposite points of the resistor.

5. In the manufacture of silicon carbide resistors, the steps which comprise forming a resistor element from a silicon carbide mix, coating the formed element with a refractory slip containing a carbonaceous substance, and thereafter applying a current to opposite points of the article.

6. In the manufacture of silicon carbide resistor elements, the steps which comprise forming an element to shape from a mix containing silicon carbide, subsequently coating the formed shape with a refractory slurry containing a conducting ingredient, and thereafter applying a current to the opposite ends of the formed element.

7. The method of recrystallizing a silicon carbide resistor so as to produce a resistor of high electrical conductivity, which comprises passing an electric current of more than 75 amperes per square inch of cross-section through the resistor while the said resistor is at a temperature sufficient to cause the self-bonding of the silicon carbide particles contained therein.

8. The method described in claim 7, wherein the resistor is embedded in a sand carbon mix during the self-bonding process.

9. The method of making a silicon carbide resistor which comprises crushing into grains silicon carbide of the compact variety, forming a resistor from a mix containing a predetermined content of the said grains, and self-bonding the resistor so formed.

10. The method of making a silicon carbide resistor which comprises crushing into grains silicon carbide of the compact variety, forming a resistor from the said grains, and self-bonding the resistor so formed by passing an electric current through the said resistor.

11. The method of varying the electrical resistance of a silicon carbide resistor which comprises forming a mix of silicon grains containing both silicon carbide of the compact variety and silicon carbide of the highly crystalline variety and varying the proportions of the two kinds of silicon carbide, whereby the electrical resistance of the finished product is altered.

12. A silicon carbide resistor containing a substantial proportion of the compact variety of silicon carbide.

13. A self-bonded silicon carbide resistor containing a substantial predetermined proportion of the compact variety of silicon carbide.

14. A silicon carbide resistor having a positive temperature coefficient of resistance over a temperature range of about 750° to 1500° C.

15. A self-bonded silicon carbide resistor substantially devoid of materials other than silicon carbide and having a specific resistance of less than 0.1 ohm per centimeter cube.

16. A self-bonded silicon carbide resistor substantially devoid of materials other than silicon carbide and having a specific resistance of less than 0.1 ohm per centimeter cube and a positive temperature coefficient of resistance over a temperature range of about 750° to 1500° C.

17. The method of making silicon carbide resistors which comprises forming the resistors from a mix comprised principally of silicon carbide grains, and self-bonding the formed mass by heating it to a recrystallizing temperature and while passing an electric current through the formed mass.

18. The method of making a silicon carbide resistor which comprises forming a resistor element from a mix comprised principally of silicon carbide, thereafter raising the temperature of the molded resistor to effect recrystallization, and passing an electric current through the resistor while it is heating to the recrystallization temperature.

19. The method of making a silicon carbide resistor which comprises forming the resistor element from a mix consisting principally of silicon carbide, coating the resistor with a slurry of finely divided refractory material, and heating the resistor to effect self-bonding by recrystallization.

20. The method of making a silicon carbide resistor which comprises forming the resistor element from a mix consisting principally of silicon carbide, coating the resistor with a slurry containing sand and carbon in a finely divided state, embedding the resistor in a granular mass containing sand and carbon, and heating the resistor to effect self-bonding by recrystallization while passing an electric current through the resistor.

In testimony whereof, I have hereunto set my hand.

ERNST HEDIGER.